(12) United States Patent
Evans

(10) Patent No.: US 7,645,320 B2
(45) Date of Patent: Jan. 12, 2010

(54) EXTRACTION PROCESS

(75) Inventor: Timothy Evans, Taunton (GB)

(73) Assignee: Minex Technologies Limited, Taunton (GB)

( * ) Notice: Subject to any disclaimer, the term of this patent is extended or adjusted under 35 U.S.C. 154(b) by 0 days.

(21) Appl. No.: 11/577,568

(22) PCT Filed: Oct. 20, 2005

(86) PCT No.: PCT/GB2005/004041

§ 371 (c)(1),
(2), (4) Date: Oct. 10, 2007

(87) PCT Pub. No.: WO2006/043065

PCT Pub. Date: Apr. 27, 2006

(65) Prior Publication Data

US 2008/0083300 A1 Apr. 10, 2008

(30) Foreign Application Priority Data

Oct. 20, 2004 (GB) ................. 0423213.8

(51) Int. Cl.
*C22B 11/06* (2006.01)
(52) U.S. Cl. .......................... 75/631; 75/637
(58) Field of Classification Search ..................... 75/631
See application file for complete search history.

(56) References Cited

U.S. PATENT DOCUMENTS

| 1,425,667 | A | * | 8/1922 | McKirahan | 75/637 |
|---|---|---|---|---|---|
| 3,896,211 | A | | 7/1975 | Mayor et al. | |
| 3,988,415 | A | | 10/1976 | Barr | |
| 4,353,740 | A | | 10/1982 | Dunn | |
| 5,074,910 | A | | 12/1991 | Dubrovsky | |
| 5,169,503 | A | | 12/1992 | Baughman et al. | |
| 5,236,676 | A | | 8/1993 | Touro et al. | |
| 6,344,067 | B1 | * | 2/2002 | Craig et al. | 75/631 |

FOREIGN PATENT DOCUMENTS

| CA | 2193783 A1 | 6/1998 |
|---|---|---|
| DE | 30419 C | 7/1884 |
| DE | 2348977 A1 | 4/1975 |
| EP | 0492691 A1 | 7/1992 |
| GB | 737889 | 10/1955 |
| GB | 780980 A | 8/1957 |
| GB | 821922 A | 10/1959 |
| GB | 862392 A | 3/1961 |
| GB | 1203967 A | 9/1970 |
| GB | 1423798 A | 2/1976 |

OTHER PUBLICATIONS

CRC Handbook of Chemistry and Physics, p. B-70. 1989.*
Patent Search for GB0423213.8, dated Mar. 3, 2005, 1 page.
International Search Report for PCT/GB2005/004041, dated Jan. 31, 2006, 3 pages.
International Search Report for PCT/GB2005/004041, dated Apr. 24, 2007, 6 pages.
GB Search Report for Application No. GB0900677.6, dated Jul. 3, 2009; 2 pages.

* cited by examiner

*Primary Examiner*—George Wyszomierski
*Assistant Examiner*—Tima M McGuthry-Banks

(57) ABSTRACT

A process for extracting a precious metal from a precious metal containing source is provided comprising the steps of: —(i) contacting the precious metal-containing source with a vapor phase chloride salt; (ii) condensing the precious metal containing volatile product of step (i); and (iii) recovering the precious metal from the condensed product of step (ii).

9 Claims, No Drawings

EXTRACTION PROCESS

FIELD OF THE INVENTION

The present invention relates to a process for extracting a precious metal from a precious metal containing source. In particular, the invention relates to an improved process for extracting a precious metal, especially gold, from a precious metal containing source using a chlorination process.

BACKGROUND OF THE INVENTION

Various methods for extracting and recovering metals, particularly precious metals, present in complex source materials such as ores and the like are known in the art.

In the case of gold, for example, one well-established method for extracting the metal from its ore involves crushing the ore, treating the gold containing pulp with a solution of a cyanide and removing the gold in the form of a complex with cyanide ions. The gold is subsequently recovered from the complex by a precipitation reaction, for example with metallic zinc or by electrolysis.

Although cyanide leaching processes of this type have found widespread application in the past, they are potentially hazardous to operate and present serious environmental concerns. Indeed, such is the current level of concern that such process are no longer operated in many territories. Moreover, these methods are not generally applicable to other precious metals; for example, silver and copper cannot effectively be extracted using cyanidation technology.

Concerns about the environmental impact of the processes involving the use of cyanides have led to considerable interest in the development of alternative, commercially more attractive and environmentally less damaging methods for extracting metals, particularly precious metals, from the materials in which they are contained.

This has led to a revival of interest in chlorination-based extraction processes whereby the metal is extracted from the material in which it is deposited by the formation of volatile chloride containing metal compounds from which the metal can be recovered. Chlorination-based processes are well known in the art and methods which have been described in the literature include the leaching of metal ores using aqueous solutions of chlorine, chlorides and hypochlorites as discussed, for example, in U.S. Pat. No. 4,353,740 and U.S. Pat. No. 5,169,503.

Other methods commonly used for extracting precious metals from ores include autoclaving. Although this method is currently commercially used in the mining industries, the associated capital costs represent a considerable disadvantage of the method.

There therefore remains a continuing need for the development of further, improved, commercially viable methods for extracting metals, especially precious metals, from ores, concentrates or other materials in which they are found. In naturally occurring deposits of precious metals, the metal is commonly present at too low a concentration to be extracted profitably using existing methods. Methods for extraction of precious metals which avoid the environmental hazards associated with conventional cyanide leaching and which may be used in situations where cyanide leaching is ineffective are particularly sought.

SUMMARY OF THE INVENTION

The present invention provides a process for extracting a precious metal from a precious metal-containing source comprising the steps of:

(i) contacting the precious metal-containing source with a vapour phase chloride salt;
(ii) condensing the precious metal-containing volatile product of step (i); and
(iii) recovering the precious metal from the condensed product of step (ii).

The present invention is based on the finding that precious metals may be extracted and recovered from materials in which they are contained in a cost-effective way and at a commercially viable recovery level by forming a metal containing chloride compound in the vapour phase, condensing the precious metal containing vapour phase product, thereby extracting the metal from its source in the form of a metal chloride compound, and recovering the extracted metal from the condensed product.

By means of the invention, the environmental pollution risks associated with conventional cyanide extraction can be avoided. Moreover, the present inventors have found that by using the present chlorination extraction process it is possible to achieve levels of extraction of the contained metals which are significantly greater than those achievable using a cyanide based process. Levels of metal extraction obtained using the present process have been found to be comparable, at least, to the levels achieved using autoclaving but can be achieved at a small fraction of the capital cost associated with this hitherto industry-standard process.

DETAILED DESCRIPTION

The method of the invention is applicable to the extraction of metals from a variety of sources, including ores, concentrates and wastes produced by mining processes together with precious metal-containing minerals and soils.

Preferably, the process of the invention is performed using a metal-containing ore as the source of the metal. The invention is not limited to one ore type, however, and the method may find application in the extraction of sulphide containing ores containing more than one metal species, for example.

The chlorination extraction process may be applied to the extraction of a variety of precious metals, including but not limited to precious metals such as silver and especially gold. As used herein, the term 'precious metal' has its conventional meaning and will be understood to encompass gold, silver, platinum and platinum group metals such as osmium, rhodium, ruthenium, iridium, and palladium.

Prior to being contacted with the vapour phase chloride, a metal-containing ore for use according to the invention may conveniently be ground and roasted at a suitably high temperature in the presence of air or oxygen in order to remove sulphides present in the ore by converting them to sulphur dioxide. Roasting may suitably be performed in a fluid-bed roaster. It will be appreciated that the temperature is not critical provided that it is high enough to remove sulphides present in the ore.

The chloride for use according to the invention may suitably be any volatile chloride which is either already in vapour form or which may readily be vapourised. Preferably, the chloride is ammonium chloride. Conveniently, the chloride vapour is present in excess. The temperature at which the reaction is performed will be chosen to ensure that the chloride remains in the vapour phase and also that the reaction with the precious metal occurs at a suitable rate. Suitably, this will be achieved by maintaining the metal containing source at a temperature at or above the temperature at which the chosen volatile chloride becomes vapourised, during the course of the reaction. It will be appreciated that the reaction temperature is not critical provided that it is high enough for the desired reaction to occur, and not so high that undesired reaction products also enter the vapour phase along with the precious metal-containing chloride compound. Generally, temperatures of between 300° C. to 650° C. are contemplated.

Conveniently, the vapour phase chloride may be contacted with the precious metal-containing source, such as a ground, roasted metal-containing ore, by passing the gaseous chloride through the source in a suitable reaction vessel such as a reactor or kiln. The process to form metal containing volatile chloride compounds may suitably be conducted continuously (for example by continuously replenishing the metal containing ore in the reaction vessel) or in a batch mode (for example by intermittently contacting the chloride vapour with the metal containing source).

Following the formation of the metal containing volatile chloride compounds according to the first step of the process of the invention, the metal-containing volatile compound products are separated from the vapour phase by condensing them using methods conventional in the art.

The metal can be recovered from the condensed vapour phase solids by any recovery means conventional in the art. In the case of gold, for example, this may conveniently be achieved by dissolving the gold-containing condensed solid products in water and treating the solution with metallic zinc to reduce the gold.

EXAMPLE

Following the method set forth above, gold was extracted from a complex gold ore obtained from a Placer Dome mine in Nevada, using gaseous ammonium chloride as the vapour phase chloride salt. The method was found to extract 26% of the gold present.

The results compare favourably with those obtained using a conventional cyanidation process which resulted in less than 5% recovery of the contained gold and are comparable to those obtained in bench scale autoclaving studies (30% recovery).

The invention claimed is:

1. A process for extracting a precious metal from a precious metal-containing source, the process comprising:
   (i) heating the precious metal-containing source in a reaction vessel;
   (ii) passing a vapor phase consisting of a volatile chloride salt through the reaction vessel containing the heated precious metal-containing source to form a volatile precious metal-containing chloride product;
   (iii) condensing the volatile precious metal-containing product of step (ii); and
   (iv) recovering the precious metal from the condensed product of step (iii).

2. The process of claim 1, wherein the precious metal-containing source is a metal ore.

3. The process of claim 2, wherein the precious metal is gold.

4. The process of claim 3, wherein the chloride salt is ammonium chloride.

5. The process of claim 1, further comprising grinding and roasting the precious metal-containing source prior to being contacted with the vapor phase chloride salt.

6. The process of claim 1, wherein the precious metal-containing source is contacted with the vapor phase chloride salt at a temperature at, or above, the vaporization temperature of the chloride salt.

7. A process for extracting gold from a gold-containing ore, the process comprising:
   (i) heating the gold-containing ore in a reaction vessel;
   (ii) passing a vapor phase consisting of gaseous ammonium chloride through the reaction vessel containing the heated gold-containing ore to form a volatile gold chloride product;
   (iii) condensing the volatile gold chloride product of step (ii); and
   (iv) recovering the gold from the condensed product of step (iii).

8. The process of claim 7, wherein the gold-containing ore is contacted with the ammonium chloride at a temperature at, or above, the vaporization temperature of the ammonium chloride.

9. The process of claim 8, further comprising grinding and roasting the gold-containing ore prior to being contacted with the ammonium chloride.

* * * * *